US012663000B2

(12) United States Patent
Wood et al.

(10) Patent No.: US 12,663,000 B2
(45) Date of Patent: Jun. 23, 2026

(54) ALTERNATOR AND ELECTRONIC FUEL INJECTION FOR OIL WELL PUMPS

(71) Applicant: INTEGRATED POWER SOLUTIONS, LLC, Roosevelt, UT (US)

(72) Inventors: Marvin Lee Wood, Roosevelt, UT (US); Gavin Perry, Vernal, UT (US)

(73) Assignee: Integrated Power Solutions, LLC, Roosevelt, UT (US)

( * ) Notice: Subject to any disclaimer, the term of this patent is extended or adjusted under 35 U.S.C. 154(b) by 52 days.

(21) Appl. No.: 18/528,531

(22) Filed: Dec. 4, 2023

(65) Prior Publication Data

US 2024/0102463 A1 Mar. 28, 2024

Related U.S. Application Data

(63) Continuation of application No. 17/902,416, filed on Sep. 2, 2022, now Pat. No. 11,879,450, which is a continuation of application No. 16/945,514, filed on Jul. 31, 2020, now Pat. No. 11,434,895.

(60) Provisional application No. 63/013,305, filed on Apr. 21, 2020, provisional application No. 62/882,399, filed on Aug. 2, 2019.

(51) Int. Cl.
| | |
|---|---|
| *F04B 47/02* | (2006.01) |
| *B60W 10/06* | (2006.01) |
| *B60W 10/08* | (2006.01) |
| *H02J 7/14* | (2006.01) |

(52) U.S. Cl.
CPC ............ *F04B 47/02* (2013.01); *H02J 7/1423* (2013.01); *B60W 10/06* (2013.01); *B60W 10/08* (2013.01)

(58) Field of Classification Search
CPC ........ F04B 47/02; F04B 17/05; F04B 49/065; F04B 47/022; H02J 7/1423; B60W 10/06
See application file for complete search history.

(56) References Cited

U.S. PATENT DOCUMENTS

| | | | | |
|---|---|---|---|---|
| 4,348,158 | A | 9/1982 | Wood | |
| 4,586,879 | A | 5/1986 | Slater | |
| 4,648,806 | A * | 3/1987 | Alexander | F04B 49/12 74/599 |
| 9,057,339 | B2 * | 6/2015 | Gwidt | F02D 35/028 |
| 10,340,755 | B1 | 7/2019 | Dreher | |
| 11,434,895 | B1 | 9/2022 | Wood | |
| 2018/0073452 | A1 | 3/2018 | Gough et al. | |

(Continued)

OTHER PUBLICATIONS

Examiner Interview Summary Record (PTOL-413) received for U.S. Appl. No. 16/945,514, mailed on May 13, 2022, 2 pages.

(Continued)

*Primary Examiner* — Michael C Zarroli
(74) *Attorney, Agent, or Firm* — Workman Nydegger

(57) ABSTRACT

An oil well pump system includes a programmable control module configured to be coupled to a fuel injector coupled to a prime mover engine. The programmable control module is configured to cause the fuel injector and engine to operate in a 350-500 RPM range. A generator is configured to be coupled to the engine, the generator is configured to operate in a 350-500 RPM range and configured to be coupled to the programmable control module and the fuel injector and configured to supply sufficient power to operate the programmable control module and the fuel injector.

19 Claims, 5 Drawing Sheets

(56)  References Cited

U.S. PATENT DOCUMENTS

| | | | |
|---|---|---|---|
| 2018/0086419 A1* | 3/2018 | Crain | H02K 7/1807 |
| 2020/0164866 A1* | 5/2020 | Suh | B60W 10/06 |
| 2023/0063292 A1 | 3/2023 | Wood et al. | |
| 2023/0347872 A1* | 11/2023 | Gesang | B60L 7/18 |

OTHER PUBLICATIONS

Non-Final Office Action received for U.S. Appl. No. 16/945,514, mailed on Feb. 4, 2022, 11 pages.
Non-Final Office Action received for U.S. Appl. No. 17/902,416, mailed on Feb. 23, 2023, 11 pages.
Notice of Allowance received for U.S. Appl. No. 16/945,514, mailed on Jun. 30, 2022, 7 pages.

\* cited by examiner

124

ALTERNATOR AND ELECTRONIC FUEL INJECTION FOR OIL WELL PUMPS

CROSS-REFERENCE TO RELATED APPLICATIONS

This application is a continuation of U.S. patent application Ser. No. 17/902,416 filed on Sep. 2, 2022, entitled "ALTERNATOR AND ELECTRONIC FUEL INJECTION FOR OIL WELL PUMPS," which is a continuation of U.S. patent application Ser. No. 16/945,514 filed on Jul. 31, 2020, entitled "ALTERNATOR AND ELECTRONIC FUEL INJECTION FOR OIL WELL PUMPS,", which claims the benefit of and priority to U.S. Provisional Patent Application Ser. No. 62/882,399 filed on Aug. 2, 2019 and entitled "ENGINE AUXILIARY POWER GENERATION," and also U.S. Provisional Patent Application Ser. No. 63/013, 305 filed on Apr. 21, 2020 and entitled "ALTERNATOR AND ELECTRONIC FUEL INJECTION FOR OIL WELL PUMPS," which applications are expressly incorporated herein by reference in their entirety.

BACKGROUND

Background and Relevant Art

Crude oil production often occurs in remote locations. Thus, it is often subject to the constraints of these remote locations. In particular there is little to no infrastructure for things such as commercial electrical power, communications, etc. For example, an oil well will typically use a pumpjack to harvest oil in an independent and mostly self-sustaining way. For example, the pumpjack is configured to use resources available at the pumpjack site to operate the pumpjack. For example, many oil pumpjacks are natural gas powered in that a natural gas engine, which is typically an internal combustion engine, is used to rotate a crank and counter weight, to actuate a pitman arm coupled to a walking beam and downhole elements to lift liquid out of a well. Natural gas is typically produced from the oil well in conjunction with the oil production. This natural gas can be cleaned and used to run the pumpjack engine.

Modern pumpjacks often include intelligent control mechanisms to control the operation of the pumpjacks. For example, such control mechanisms are often implemented using the Supervisory Control and Data Acquisition (SCADA) architecture. These control mechanisms can be used to monitor changes in liquid flow, well pressure, temperature, etc. Alternatively, or additionally, the systems may be configured to intelligently respond to changes in the drilling process for purposes such as safety, efficiency, or for other reasons.

Note however, these systems typically require external control power in the form of low-voltage electricity to operate the logical circuits, solenoid and valve controls, etc. However, as noted previously, an oil well is typically located in a remote location not having access to power infrastructure. As such, many oil wells use electrical power obtained from a combination of solar cells and batteries. Such systems have power to power the control systems from electricity generated by solar energy when the Sun shines but use battery power when the Sun is not shining. Note that such systems typically produce electricity that is 12 V in the 3 to 5 amp range. Thus, the number and complexity of operations that can be performed using this power is limited. Indeed, in many systems, there is insufficient power available to charge the batteries at the well site. Therefore, those batteries often need to be replaced on a regular basis due to being depleted by control operations.

Further, the limited amount of electrical power available limits other types of activities using electrical power. For example, it may be difficult to implement power-hungry applications.

Further still, it may be difficult to implement devices such as fuel injectors which may require more power than is traditionally available for compressing gasses in such fuel injectors.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes an oil well auxiliary power system. An oil well extraction system includes a prime mover coupled to a pumpjack. The prime mover comprises an engine. A stub shaft is coupled to the engine of the prime mover. A gear system is coupled to the stub shaft. A generator is coupled to the gear system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
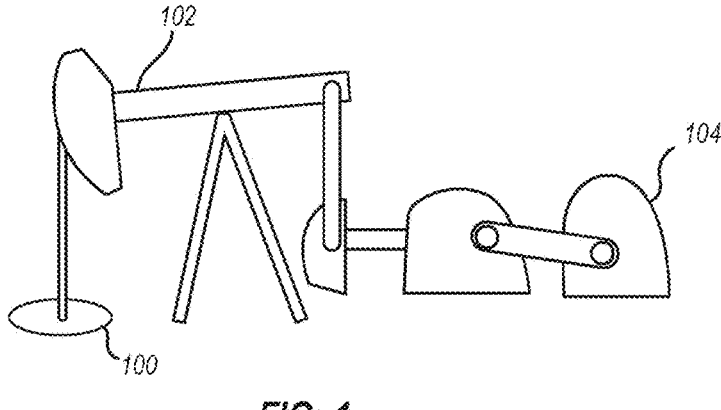
FIG. 1 illustrates a power generating system implemented at an oil well site.
Figure 2:
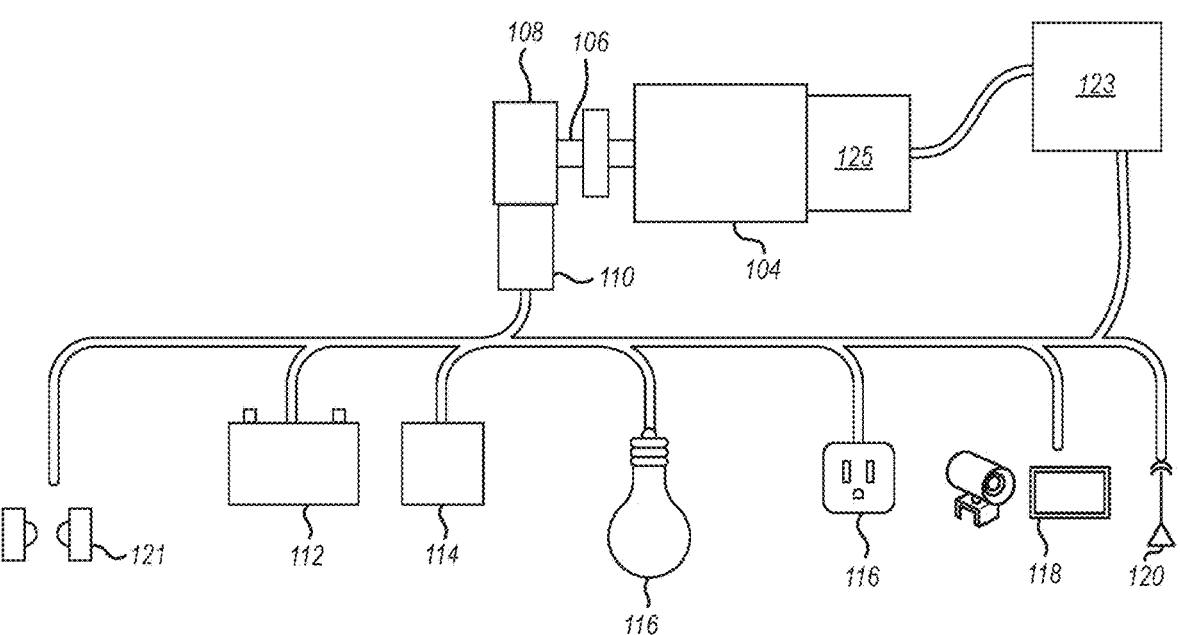
FIG. 2 illustrates additional details of the power generating system implemented at the oil well site.

Referring now to FIGS. 1 and 2, an example is illustrated. FIG. 1 illustrates an oil well 100, a pumpjack 102 for extracting oil from the oil well 100, and a prime mover 104 coupled to the pumpjack 102.

The prime mover 104 comprises an engine, which in some embodiments is a natural gas engine. The prime mover 104 is coupled to a stub shaft 106 (see FIG. 2). The stub shaft 106 may be an additional shaft that extends outside of the prime mover 104 to allow connection of a generator as illustrated further herein. That is, in some embodiments, the stub shaft is added to a conventional prime mover to allow for the configurations illustrated herein. The stub shaft 106 is coupled to a planetary gear drive 108 (or other gearing system). The planetary gear drive 108 is coupled to a generator 110, which in some embodiments may be an alternator.

In particular, the stub shaft 106, in some embodiments, is configured to operate in the 300-500 RPM range. However, many alternators need to be operated in the 2100 to 3100 RPM range. As such, the planetary gear drive 108 may have a gear ratio configured to use the speed of the stub shaft 106 to create an output speed of 2100 to 3100 RPMs for the generator 110. Note that other RPM ranges and gear ratios may be used in other embodiments.

In some embodiments, the generator 110 may be an alternator configured to output 12V and at least 20 Amps. In some embodiments, this can be accomplished by using an alternator having, or coupled to a rectifier circuit to convert output from the alternator from AC current to DC current, a voltage regulator to regulate the voltage at 12V, and/or any other appropriate circuits needed to maintain appropriate voltages and currents. In some embodiments, commercial, off-the-shelf alternators may be used. One such alternator may be an off the shelf alternator for use with small tractors. Alternatively, an alternator used for a motorcycle may be used.

In some embodiments, a 24 VAC, 40 Amp alternator may be used.

Note that in some embodiments, a custom generator or alternator may be implemented. For example, as will be illustrated below, various magnets and coils may be added to a gearing system, such as the planetary gear drive 108 to combine the alternator and gearing system as appropriate. Although a custom generator or alternator external to the gearing system may alternatively be implemented.

Note that in some embodiments, the alternator may output AC voltage, which may be converted to DC voltage, as described above, when needed.

In some embodiments the generator 110 may be dual purpose. In particular, the generator 110 may function as a starter motor to start the prime mover engine. For example, a battery (e.g., in the battery bank 112) at the oil well site may be applied to the generator 110 causing the generator 110 to rotate, causing the planetary gear drive 108 to rotate, causing the stub shaft 106 to rotate, causing the valves, pistons, and other elements of the engine on the prime mover 104 to be actuated. If fuel (e.g., natural gas collected from the well 100 and stored for later use) and a combustion ignition source are provided, the prime mover engine will start running. Once the prime mover engine is started, the generator 110 can function as a generator to produce power as described above.

The generator 110 can be coupled to one or more of a number of different power consuming device to provide power to these devices. For example, as illustrated in FIG. 2, the generator may be coupled to a battery bank 112 to charge the batteries in the battery bank. In particular, the battery bank 112 may be able to provide power to various power consuming devices at the oil well site when the prime mover 104 is not active and providing power via the generator 110. The battery bank 112 may be any one of a number of different battery technologies such as lead acid, nickel metal hydride, lithium, or other appropriate battery chemistries.

The generator 110 may be coupled to a control mechanism 114. For example, the control mechanism 114 may be a Supervisory Control and Data Acquisition (SCADA) architecture control mechanism. This can be used to monitor and control well pressures, fluid flow, temperature, or other elements. Note that because the generator 110 is able to produce significant amounts of power, the control mechanism 114 can control a broader number and type of sensors and actuators as compared to previous systems. In particular, the control mechanism 114 may be configured to control various valves and solenoids as well as to monitor various sensors around the wellsite.

FIG. 2 further illustrates that the generator 110 is coupled to lighting 116. Often, the lighting 116 will be implemented using LED lighting or other appropriate lighting. The lighting 116 allows operators and other professionals to inspect, maintain, or otherwise interact with the equipment at the wellsite. Thus, the lighting is not simply indicator lighting, but lighting sufficient to illuminate equipment for inspection. Thus, for example, some embodiments may be configured to produce at least 1000 lumens.

FIG. 2 further illustrates that the generator 110 may be coupled to an inverter 116. The inverter 116 is able to convert the voltages produced by the generator 110 to standard power voltages and currents. For example, the inverter 116 may be able to provide 120 or 240 V AC to allow standard power equipment and devices to be utilized at the wellsite.

FIG. 2 further illustrates that the generator 110 may be coupled to a CCTV system 118. In particular, because the generator 110 is able to produce sufficient amounts of power, a CCTV system including various cameras and monitors can be powered by the generator 110 to provide visual recording, playback, and/or data transmission of visual and/or audio data from wellsite.

FIG. 2 further illustrates that the generator 110 is coupled to communication equipment 120. For example, various radio communication hardware, satellite communication hardware, or other communication hardware may be powered by the generator 110 to provide for remote communication with the equipment at the wellsite and/or remote monitoring of equipment at the wellsite.

FIG. 2 further illustrates that the generator 110 is coupled to motion/proximity sensors 121. In particular, the motion/proximity sensors 121 may be used to monitor unusual movements about the well site to detect potential sabotage, theft, or even domestic animals or wildlife interaction with equipment at the wellsite.

Some embodiments may be configured to provide engine management for more efficient oil well, prime mover engine operation. For example, some embodiments use generated power, generated by the generator 110, to power an added engine programmable control module (PCM) 123 with a custom program using sensors input to determine air intake, fuel pressure, ambient conditions, crank position, wide band $O_2$ and exhaust gas temperature. The PCM will control ignition timing using ignition elements and fuel to air ratios using a fuel injector 125 based on this input. Note that fuel injectors often require additional power input than would normally be available from previous systems, and thus the embodiments illustrated herein can have sufficient power output at the generator 110 to implement the PCM 123 and the fuel injector 125.

Previously, such PCMs were not able to be used with prime mover engines as there was no source of power sufficient to run the PCMs, associated sensors, and the fuel injector. Thus, previous prime movers for oil wells would run without the closed loop controls provided by PCMs. By implementing the generator described herein, such PCMs and fuel injectors can now be implemented on prime mover engines. For example, some fuel injectors may require around 1 to 1.5 Amps. Other fuel injectors may require as much as 6 Amps. The system illustrated herein allows such fuel injectors to be implemented on a prime mover engine, where they were previously not able to be implemented.

Note that by implementing the generator 110 at the wellsite, other equipment that would typically not be available at the wellsite could be implemented and powered by the generator 110.

The generator 110 may be coupled to the devices above alone or in various combinations as appropriate.

Figure 3:
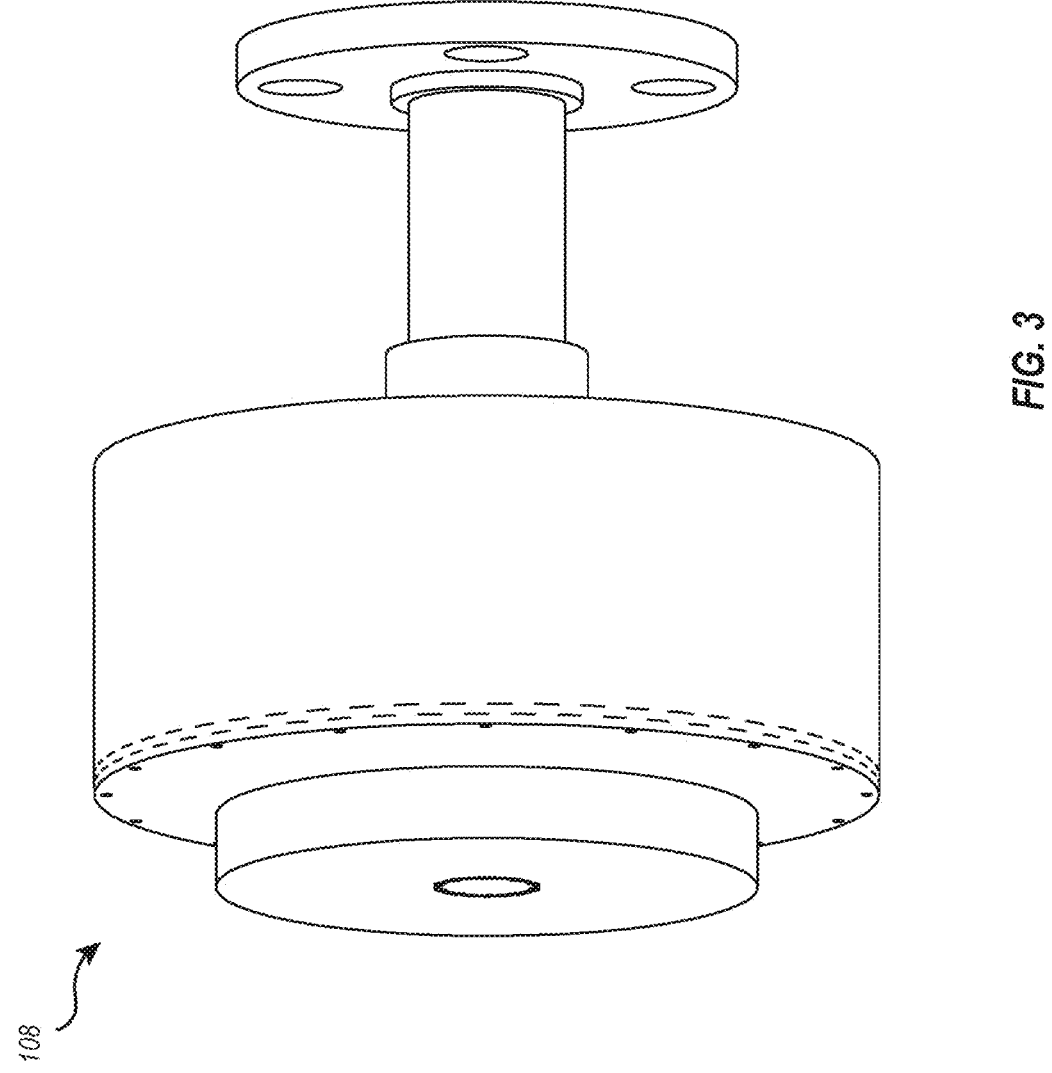
FIG. 3 illustrates an assembled view of a planetary gear drive.

Referring now to FIGS. 3, 4, 5, and 6, additional elements and details of the planetary gear drive 108 are illustrated. In particular, FIG. 3 illustrates an assembled embodiment of the planetary gear drive 108. The examples illustrated in FIGS. 3 through 6 are shown with accurate proportional dimensions.

Figure 4:
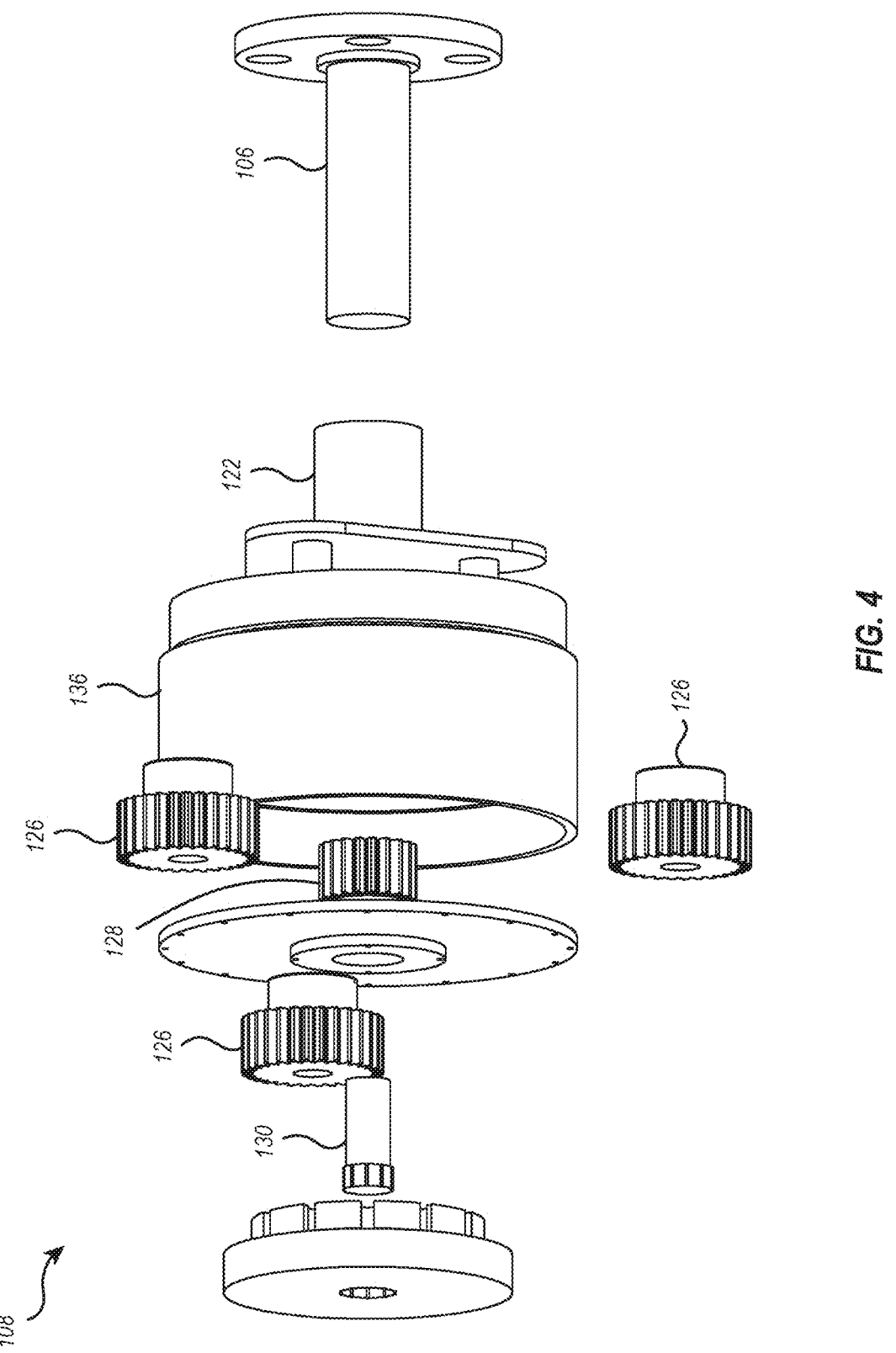
FIG. 4 illustrates an exploded view of the planetary gear drive.
Figure 5:
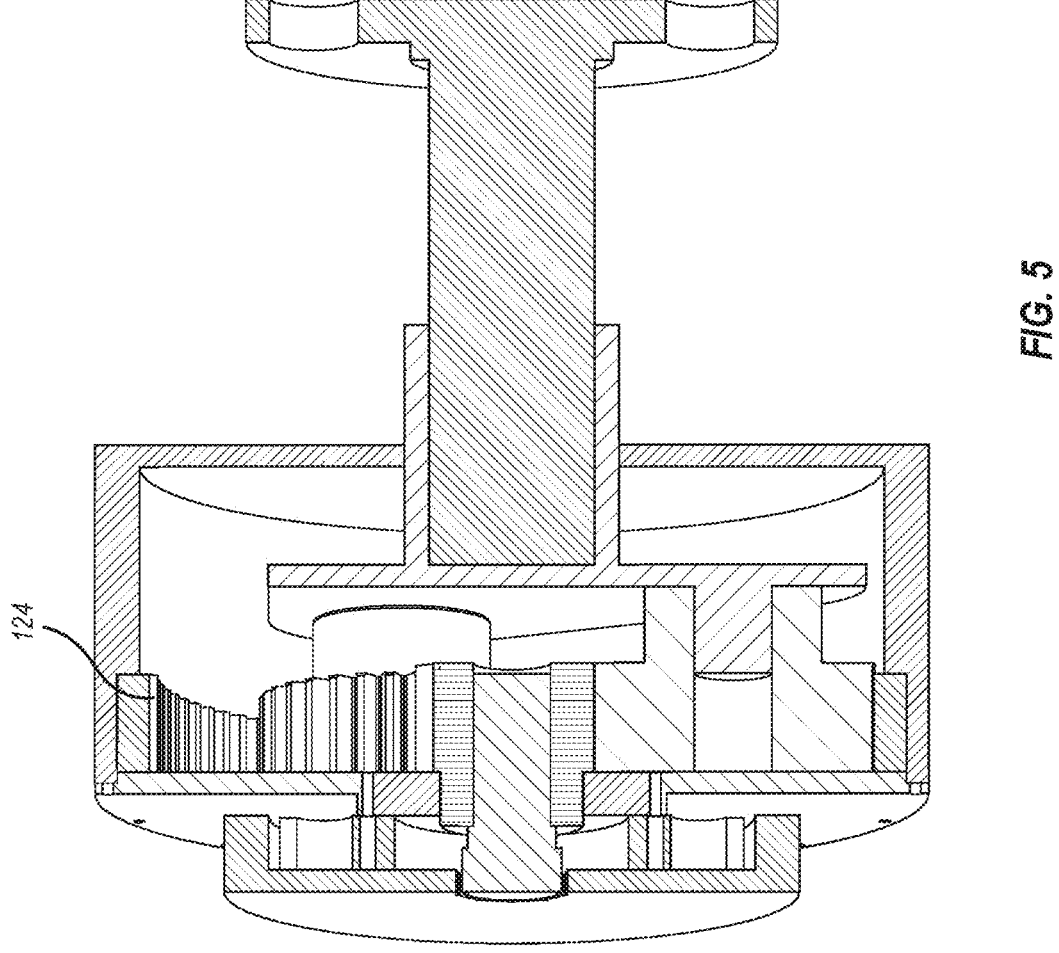
FIG. 5 illustrates a cutaway view of the planetary gear drive.
Figure 6:
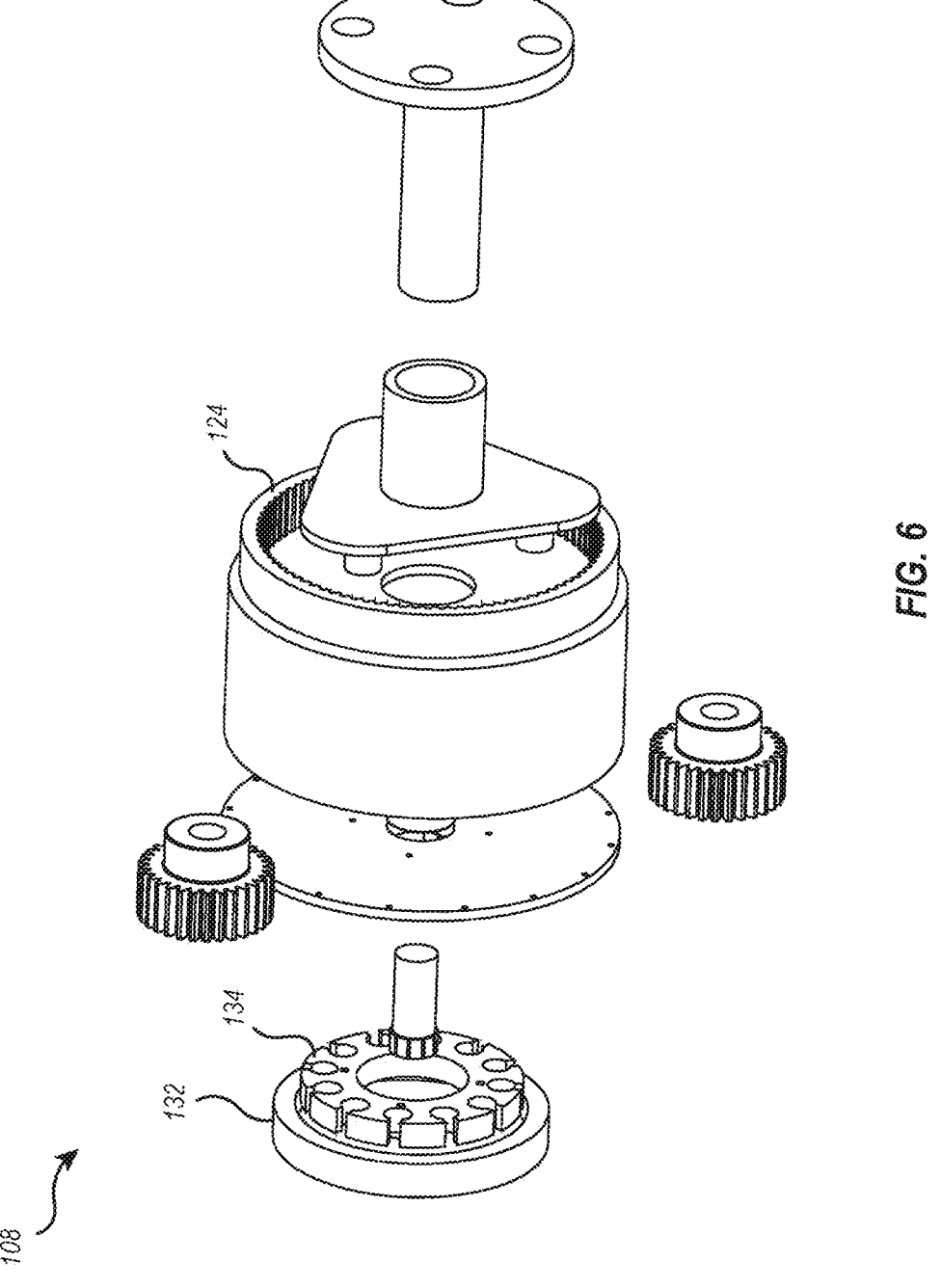
FIG. 6 illustrates another exploded view of the planetary gear drive.

FIG. 4 illustrates an exploded view of the planetary gear drive 108. In particular, FIG. 4 illustrates the stub shaft 106. The stub shaft 106 is coupled to a P drive 122. As illustrated in FIG. 5, which illustrates a cutaway view of the planetary gear drive 108, and in FIG. 6 which illustrates an alternative view exploded view of the planetary gear drive 108, the P drive is coupled to a ring gear 124.

Returning once again to FIG. 4, the ring gear 124 is coupled to a series of planetary gears 126. The planet gears are coupled to a Sun gear 128. The Sun gear 128 is coupled to a driveshaft 130.

FIGS. 3-6 further illustrate a bell 132 and a stator 134. In this example, the bell 132 includes magnets within the bell and the stator 134 provides one or more current carrying element. For example, in one embodiment, the stator 134 may have current carrying elements, such as wiring, for a 3 phase generator. Thus, in this example, the bell 132 and the stator 134 implement the generator 110 shown in FIG. 2. Note that in other embodiments, the drive shaft 130 may be coupled to an external generator rather than implementing the bell 132 and stator 134 as a generator as shown.

To provide a sense of the size of the planetary gear drive 108, the dimensions of various components will now be described. The housing 136, in the illustrated example, has a diameter of 9.42 inches and a depth of 3.88 inches. The stub shaft has a diameter of 1.875 inches and a length of 5.8 inches. While these particular sizes are shown, it should be appreciated that in other embodiments, different sizes and/or configurations may be implemented. Indeed, it should be noted that a different gear system altogether may be used and that the planetary gear drive 108 is simply one example of a gear system that may be used. Indeed, in some embodiments, with an appropriately designed bell and stator, the gear system may be eliminated altogether.

Thus, while the illustrated example is shown with a 6.5 inch diameter bell and appropriately sized stator, in some alternative embodiments, the stator 134 may be a larger stator, such as a stator being sized from 10 inches to 12 inches, and the bell 132 may be likewise appropriately sized to for the larger stator. In this case, the gearing shown can be eliminated, such that the bell could be coupled directly to the stub shaft 106 to produce power. However, in some such embodiments, lower amounts of power will be produced than in the previous example.

In some embodiments, the generator 110 may be designed to operate between temperatures of −40° to +50° C. In some embodiments, the generator 110 may be enclosed in, or be designed to meet the enclosure requirements for a NEMA 4x housing. In some embodiments, the generator 110 (either connected to intervening gearing or alone) may be designed to mount on a 1.875 inch stub shaft. In some embodiments, the generator 110 may be designed to generate 3 phase a/c current. In some embodiments, the generator 110 may be designed to generate a minimum of 400 watts and 30 volts at 350 rpm. The generator 110 may be configured for operation at an RPM range of 350-500 rpm.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An oil well pump system comprising:
   a programmable control module configured to be coupled to a fuel injector coupled to a prime mover engine, the programmable control module configured to cause the fuel injector and prime mover engine to operate in a 350-500 RPM range; and
   a generator configured to be coupled to the prime mover engine, the generator configured to operate in a 350-500 RPM range and configured to be coupled to the programmable control module and the fuel injector and configured to supply sufficient power to operate the programmable control module and the fuel injector.

2. The oil well pump system of claim 1, wherein the prime mover engine is a natural gas engine.

3. The oil well pump system of claim 1, wherein the generator is configured to be coupled to a stub shaft coupled to the prime mover engine.

4. The oil well pump system of claim 1, wherein the generator comprises a planetary gear system.

5. The oil well pump system of claim 1, wherein the generator comprises a stator being sized between 10 inches and 12 inches.

6. The oil well pump system of claim 1, wherein the generator comprises an enclosure meeting NEMA 4x requirements.

7. The oil well pump system of claim 1, wherein the generator generates 3 phase a/c current.

8. The oil well pump system of claim 1, wherein the generator generates a minimum of 400 watts and 30 volts at 350 rpm.

9. The oil well pump system of claim 1, wherein the generator operates between temperatures of −40° to +50° C.

10. The oil well pump system of claim 1, wherein the generator is configured to operate as a starter motor for the prime mover engine.

11. A programmable control module operational system comprising:

a connection configured to be coupled to a fuel injector coupled to a prime mover engine configured to operate in a 350-500 RPM range;

a connection configured to be coupled to an ignition element of the prime mover engine;

instructions stored on the programmable control module that when executed by the programmable control module cause the programmable control module to control fuel ratios using the fuel injector and ignition timing using the ignition element to cause the prime mover engine to operate in a 350-500 RPM range; and wherein the programmable control module comprises a connection configured to be coupled to a generator configured to be coupled to the prime mover engine, the generator configured to operate between temperatures of −40° to +50° C.

12. The programmable control module operational system of claim 11, wherein the programmable control module comprises a connection configured to be coupled to a generator configured to be coupled to the prime mover engine, the generator configured to operate in a 350-500 RPM range and configured to supply sufficient power to operate the programmable control module and the fuel injector.

13. The programmable control module operational system of claim 11, wherein the prime mover engine is a natural gas engine.

14. The programmable control module operational system of claim 11, wherein the programmable control module comprises a connection configured to be coupled to a generator configured to be coupled to the prime mover engine, the generator configured to generate a minimum of 400 watts and 30 volts at 350 rpm.

15. A programmable control module operational system comprising:

a connection configured to be coupled to a fuel injector coupled to a prime mover engine configured to operate in a 350-500 RPM range;

a connection configured to be coupled to an ignition element of the prime mover engine;

instructions stored on the programmable control module that when executed by the programmable control module cause the programmable control module to control fuel ratios using the fuel injector and ignition timing using the ignition element to cause the prime mover engine to operate in a 350-500 RPM range; and wherein the programmable control module comprises a connection configured to be coupled to a generator configured to be coupled to the prime mover engine, the generator configured to generate a minimum of 400 watts and 30 volts at 350 rpm.

16. The programmable control module operational system of claim 15, wherein the programmable control module comprises a connection configured to be coupled to a generator configured to be coupled to the prime mover engine, the generator configured to operate in a 350-500 RPM range and configured to supply sufficient power to operate the programmable control module and the fuel injector.

17. The programmable control module operational system of claim 15, wherein the prime mover engine is a natural gas engine.

18. The programmable control module operational system of claim 15, wherein the programmable control module comprises a connection configured to be coupled to a generator configured to be coupled to the prime mover engine, the generator configured to operate between temperatures of −40° to +50° C.

19. The programmable control module operational system of claim 15, wherein the programmable control module comprises a connection configured to be coupled to a generator configured to be coupled to the prime mover engine, the generator configured to generate a minimum of 400 watts and 30 volts at 350 rpm.

\* \* \* \* \*